United States Patent [19]
Parker

[11] 4,435,635
[45] Mar. 6, 1984

[54] HEAT BARRIER FOR DESOLDERER AND HEATER ASSEMBLY

[75] Inventor: Oscar E. Parker, Glen Burnie, Md.
[73] Assignee: Pace Incorporated, Laurel, Md.
[21] Appl. No.: 366,002
[22] Filed: Apr. 6, 1982
[51] Int. Cl.³ .......................... B23K 3/02; H05B 3/06
[52] U.S. Cl. .................................. 219/227; 219/229; 219/235; 219/236; 228/55
[58] Field of Search ................ 219/227, 229, 230–232, 219/235–241, 533; 228/51, 52, 53, 55; 165/185

[56] References Cited

U.S. PATENT DOCUMENTS

| | | | |
|---|---|---|---|
| 2,147,981 | 2/1939 | Kuehl | 219/236 |
| 2,257,376 | 9/1941 | Grey | 219/227 |
| 2,475,376 | 7/1949 | Darling | 219/241 |
| 2,552,253 | 5/1951 | Brown | 219/236 |
| 2,952,763 | 9/1960 | Gustafsson | 219/230 |
| 3,141,088 | 7/1964 | Johnson | 219/236 |
| 3,392,897 | 7/1968 | Siegel | 219/229 |

FOREIGN PATENT DOCUMENTS 768461  2/1957  United Kingdom ................ 219/230

*Primary Examiner*—B. A. Reynolds
*Assistant Examiner*—Teresa J. Walberg
*Attorney, Agent, or Firm*—Gerald J. Ferguson, Jr.; Joseph J. Baker

[57] ABSTRACT

An improved thermal barrier for rigidly connecting the heater assembly to a handle assembly in a desoldering device. In a preferred embodiment, the thermal barrier includes a slotted spacer portion which is connected to the heater assembly and serves to reduce heat transferred into the thermal barrier by means of radiation, convection and reduced conductivity. The thermal barrier also includes a portion connecting the slotted spacer portions to mounting sections which are connected to the handle assembly such that an indirect path for heat conduction is established between the heater assembly and the handle assembly. In some preferred embodiments, a fin is included to increase the surface area of the thermal barrier and further transfer heat from the thermal barrier to the atmosphere. A further embodiment includes a slotted fin which not only increases the surface area of the thermal barrier but also increases the resistance to heat conductivity further improving the thermal characteristics of the heat barrier.

5 Claims, 5 Drawing Figures

HEAT BARRIER FOR DESOLDERER AND HEATER ASSEMBLY

BACKGROUND OF THE INVENTION

The present invention relates to insulation in general and specifically to the reduction of heat transfer from the heater assembly to the handle of a desoldering device.

The manufacture and repair of modern electronic devices requires the ability to solder and unsolder electrical connections on very small devices, for example, printed circuit boards and the like. A device has been developed which not only provides sufficient heat to melt the solder in a soldered junction, but also provides a suction to withdraw melted solder from the area of the joint allowing the parts to be separated even after any solder residue has solidified. Such a desoldering device is described in U.S. Pat. No. 3,392,897 to Siegel issued July 16, 1968.

By reference to FIG. 2 in the Siegel patent, the major components of the desoldering device will be clearly evident. A heater assembly 14 has a small tubular tip inserted in the front end thereof which is heated and serves to conduct sufficient heat to melt the solder at the area of interest. The tip 12 is also in fluid communication through end portion 51 with a solder catcher tube 72 and from there to a vacuum fitting assembly 19. The heater assembly 14 is mounted to a handle assembly 17 by means of a thermal baffle assembly whose function is to reduce as much as possible heat transferred from the heater assembly 14 to the handle 17. Obviously, it is desirable that the handle assembly remain as cool as possible while the heater assembly maintains tip 12 at a sufficient temperature to readily melt solder which is to be removed. The heat path in the prior art is from the heater assembly to the metal plate 18 from there through screws 22, non-metallic plate 20 and through screws 26 into the hollow hub 28. Siegel notes that the primary insulation is the air space provided between metal plate 18 and non-metallic plate 20 although the non-metallic nature of plate 20 will itself serve to provide some insulation.

While the Siegel reference teaches a thermal barrier, under prolonged usage of the device, the handle especially in the vicinity of hub 28 becomes uncomfortably hot degrading operator performance. Additionally, although the use of a non-metallic plate 20 increases the effectiveness of the thermal barrier, it decreases the rigidity between tubular tip 12 and the handle itself. For preciseness of operation, it is desirable that the tip 12 be rigidly coupled to the handle assembly 17. Furthermore, it can be seen that spacers 24 have a minimal surface area allowing essentially all heat conducted into the spacer 24 by screw 22 to be conducted into the non-metallic plate 20.

Thus, even though the Siegel disclosure represented the state-of-the-art at the same time, it had several disadvantages which included only moderate thermal insulation between the heater assembly and the handle and the lack of an extremely rigid coupling between the tubular tip and the handle assembly.

SUMMARY OF THE INVENTION

In view of the above and other disadvantages of the prior art, it is an object of the present invention to provide a thermal barrier between the handle and the heater assembly of a desoldering device which provides a rigid coupling therebetween while at the same time, reduces the temperature of the handle during prolonged operation.

It is a further object of the present invention to provide an improved thermal barrier between the handle and the heater assembly of a desoldering device such that heat is radiated away from the thermal barrier instead of being conducted to the handle.

It is an additional object of the present invention to provide an improved heat barrier for a desoldering device which utilizes not only an extended or tortuous conduction path but also enhanced radiation and convection characteristics to provide the lowest amount of heat actually conducted into the desoldering device handle.

The above and other objects are achieved in accordance with the present invention by providing a thermal barrier which is comprised of metal such that a rigid coupling between the tubular tip and handle assembly is achieved. The increased conductivity through the thermal barrier due to its metal construction is offset by providing a non-linear heat path between heater assembly and handle assembly connection points to the thermal barrier. Temperatures at the handle assembly are further reduced due to one or more additional radiation and convection surfaces provided on the thermal barrier. These surfaces may be created by providing an air space in the portion of the thermal barrier which acts as a spacer and serves to connect the barrier to one or both of the heater assembly and the handle assembly. The surface could also comprise a fin attached to the thermal barrier. In a preferred embodiment, a combination of a slotted spacer attaching the thermal barrier to the heater assembly and a fin located on the thermal barrier between the slotted spacer and the handle attachment point is used with success.

BRIEF DESCRIPTION OF THE DRAWINGS

A more complete appreciation of the invention, and many of the attendant advantages thereof, will be readily apparent by reference to the accompanying drawings, wherein.

DETAILED DESCRIPTION OF PREFERRED EMBODIMENTS

Figure 1:
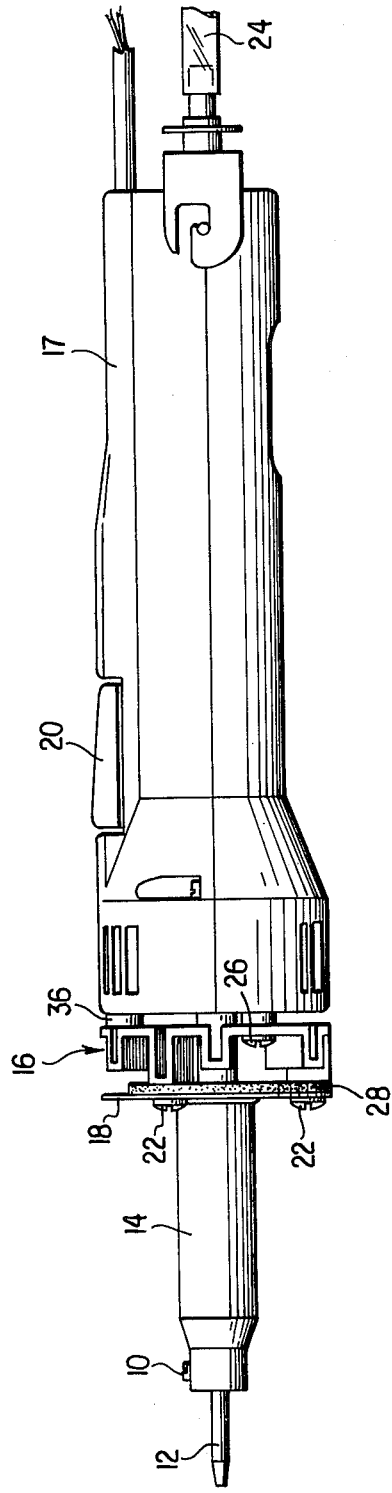
FIG. 1 is a side perspective view of a desoldering device in accordance with one embodiment of the present invention.

Referring now more particularly to the drawings, wherein like numerals represent like elements throughout the several views, FIG. 1 illustrates a desoldering device with a heat barrier in accordance with the present invention. Heater asembly 14 includes tubular tip 12 which in a preferred embodiment is maintained in place with set screw 10. The heater assembly includes a mounting plate 18 which is rigidly connected to thermal barrier 16 by means of screws 22. A lightweight handle assembly 17 is connected to thermal barrier 16 by means of scrwes 26. The handle assembly may include an electrical switch 20 for controlling the operation of the heater element in the heater assembly 14. In a preferred embodiment, the handle also includes a solder catcher (which is in fluid communication both with tubular tip 12 and vacuum line 24, the construction of which is conventional and excluded in the interest of clarity). The main structure of interest in the present invention is the structure connecting the heater assembly 14 to the handle assembly 17 and how this structure accomplishes the various objects of the present invention.

Figure 2:
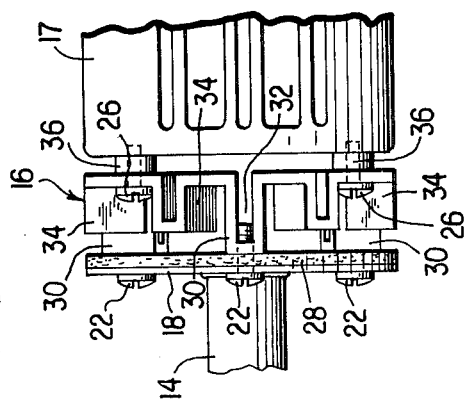
FIG. 2 is a side view illustrating the use of the thermal barrier to connect the heater assembly and the handle assembly of the desoldering device.

A more detailed understanding of the structural interrelationship can be seen by reference to FIG. 2 which shows the heater assembly, the handle and their interconnection to the thermal barrier 16 by means of screws 22 and 26. While the convolutions in the metal thermal barrier extend in a generally circular arrangement, the conduction, convection and radiation aspects of the thermal barrier shown in FIG. 2 can perhaps be better understood by reference to FIG. 3A. This figure shows the heater assembly mounting plate 18 which is separated from the thermal barrier 16 by an insulation layer 28. Screw 22 is firmly tightened to rigidly connect mounting plate 18 to the thermal barrier 16 at the slotted spacer portion 30 of the thermal barrier. It is apparent that air flowing through slot 32 will be heated and remove heat from this portion of the thermal barrier. Additionally, the reduced width of the thermal barrier in this region (as compared to prior art spacer elements) provides a less conductive path for heat flowing from mounting plate 18 to handle assembly 17. This slotted spacer portion could connect the thermal barrier to either the heater assembly or the handle or both although in the preferred embodiments shown, it serves to connect the thermal barrier to the heater assembly.

Figure 3C:
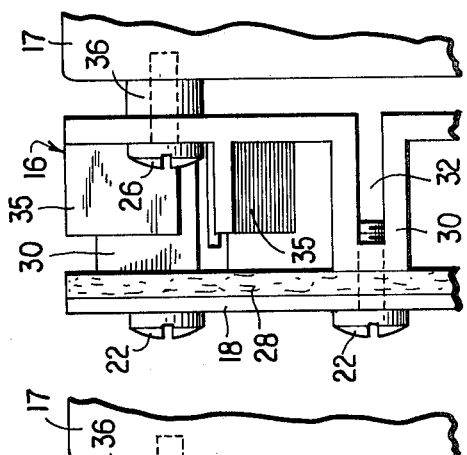
FIGS. 3A, 3B and 3C are side views showing different embodiments of the thermal barrier in accordance with the present invention.
Figure 3B:
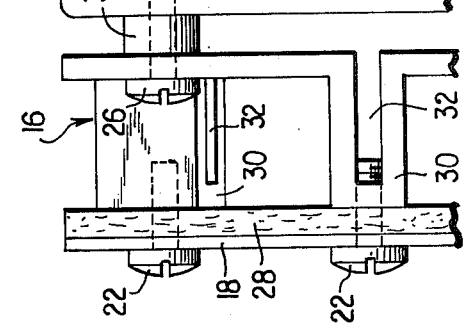
Figure 3A:
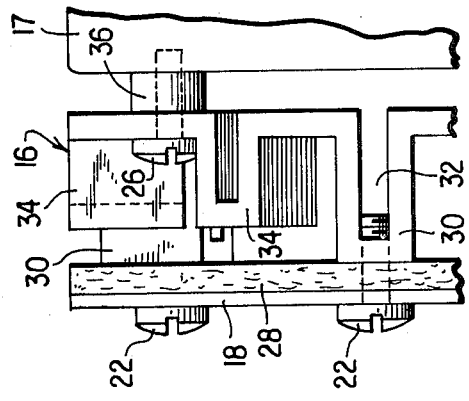

In the embodiment shown in FIG. 3A, the actual conduction path for heat travelling through the thermal barrier is extended by means of slotted fin 34. In addition to providing a much longer conduction path (than the linear distance between mounting screws 22 and 26) the surface area of the slotted fin serves to radiate heat into the surrounding air which would otherwise be transferred to the handle. Therefore, the extra surface area serves to radiate away from the handle heat which would normally be conducted directly to the handle. Finally, a spacer 36 is utilized to maintain a slight separation between the heat barrier and the handle 17 especially when screw 26 is tightened.

In the embodiments depicted in FIGS. 3B and 3C, the slotted spacer portion 30 is utilized to reduce the amount of heat carried through the rest of the thermal barrier 16, as previously described with reference to FIG. 3A. However, in these embodiments where it may not be necessary to dissipate the amount of heat as in the FIG. 3A embodiment, the slotted fin 34 has been deleted. In some installations where there is a relatively low powered heater assembly being used, the embodiment in FIG. 3B will be sufficient to maintain proper handle temperatures during prolonged operation. The embodiment shown in FIG. 3C adds a fin 35 to increase the heat radiated from the thermal barrier but this does not increase the heat conduction path as does the slotted fin 34 in the embodiment shown in FIG. 3A.

By reference to the above figures, it can be seen that the inclusion of slotted spacer portion 30 utilizes an increased heat transfer to the air by virtue of radiation and convection cooling and provides an at least indirect path of conduction for heat travelling from the heater assembly to the handle assembly. As noted, many different combinations of slotted fins, unslotted fins and spacers can be used to improve the heat blocking characteristics of the thermal barrier depending on the temperature differential desired between the heater assembly and the handle assembly. Because of the mechanical characteristics and the desire for rigid coupling between the heater assembly and the handle assembly, stainless steel or a comparable aluminum alloy are used in a preferred embodiment. This is not to say, however, that where suitable plastics and other materials having the desired mechanical coupling characteristics are known, that they could not be substituted successfully for the above-described preferred materials. Of course, where slightly degraded mechanical coupling between the heater asembly and the handle assembly can be tolerated, materials of lesser rigidity could be used especially if they were constructed out of materials having very poor heat conduction properties.

Thus, in view of the above teachings, many modifications of the thermal barriers shown in FIGS. 1, 2 and 3A–3C will become obvious to those of ordinary skill in the art. The applicant's invention therefore is not limited to the specific embodiments and examples shown and discussed herein and are limited only in accordance with the appended claims.

The embodiments of the invention in which an exclusive property or privilege is claimed are defined as follows:

1. An improved thermal barrier for rigidly connecting an elongate heater assembly with an elongate handle assembly, each assembly having a longitudinal axis which is substantially coincident with the axis of the other assembly, said heater assembly including a generally circular mounting plate and said handle assembly including spacers thereon, said thermal barrier comprising:

a plurality of slotted spacer portions, equiangularly disposed around said longitudinal axis, comprising a means for connecting said thermal barrier to said mounting plate;

a plurality of generally arcuate, coplanar mounting sections, equiangularly disposed around said longitudinal axis and axially displaced from said mounting plate comprising a means for connecting said thermal barrier to said handle assembly spacers; and means, connecting each of said spacer portions to an adjacent mounting section, for defining an indirect conduction path between each of said connecting means.

2. The thermal barrier according to claim 1, wherein said indirect conduction path means includes a slotted fin, said slotted fin comprising a means for increasing the surface area of said barrier and for increasing the length of the conductive path between said connecting means.

3. The thermal barrier according to claim 1, wherein said indirect conduction path means includes a fin, said fin comprising a means for increasing the surface area of said barrier.

4. The thermal barrier according to claim 1, wherein there is further provided a generally circular insulator, disposed between said spacer portions of said thermal barrier and said mounting plate.

5. The thermal barrier according to one of claims 1-4, wherein said thermal barrier is comprised of a metal material and said spacer portions and said mounting sections are fastened to said mounting plate and said handle assembly spacers, respectively, by means of machine screws.

* * * * *